US009492983B2

(12) United States Patent
Chen et al.

(10) Patent No.: US 9,492,983 B2
(45) Date of Patent: Nov. 15, 2016

(54) FRAME FOR HYDRAULIC APPARATUS

(71) Applicant: JI ZHUN PRECISION INDUSTRY (HUI ZHOU) CO., LTD, Huizhou (CN)

(72) Inventors: Tang-Quan Chen, Shenzhen (CN); Xiao-Bo Yuan, Shenzhen (CN); Yi-Min Jiang, Shenzhen (CN); Jun-Qi Li, Shenzhen (CN)

(73) Assignee: JI ZHUN PRECISION INDUSTRY (HUI ZHOU) CO., LTD., Huizhou (CN)

( * ) Notice: Subject to any disclaimer, the term of this patent is extended or adjusted under 35 U.S.C. 154(b) by 0 days.

(21) Appl. No.: 14/585,492

(22) Filed: Dec. 30, 2014

(65) Prior Publication Data

US 2015/0192240 A1 Jul. 9, 2015

(30) Foreign Application Priority Data

Jan. 8, 2014 (CN) .......................... 2014 1 0007951

(51) Int. Cl.
*F16M 1/00* (2006.01)
*B30B 1/16* (2006.01)
*B30B 15/04* (2006.01)

(52) U.S. Cl.
CPC *B30B 1/16* (2013.01); *B30B 15/04* (2013.01)

(58) Field of Classification Search
USPC ........................................... 248/637; 425/151
See application file for complete search history.

(56) References Cited

U.S. PATENT DOCUMENTS

| | | | | | |
|---|---|---|---|---|---|
| 1,749,545 | A * | 3/1930 | Pierce | B21D 28/002 | 100/286 |
| 1,918,059 | A * | 7/1933 | Sherman | B44B 5/0023 | 74/38 |
| 3,805,875 | A * | 4/1974 | Daugherty | B29C 45/03 | 164/159 |
| 3,826,599 | A * | 7/1974 | DeSantis | B30B 11/04 | 425/352 |
| 4,094,621 | A * | 6/1978 | Hehl | B22D 17/26 | 425/107 |
| 4,133,260 | A * | 1/1979 | Gundal | B30B 1/16 | 100/257 |
| 4,166,716 | A * | 9/1979 | DeSantis | B30B 11/04 | 425/352 |
| 4,315,728 | A * | 2/1982 | Hehl | B29C 45/17 | 425/450.1 |

(Continued)

*Primary Examiner* — Monica Millner
(74) *Attorney, Agent, or Firm* — Zhigang Ma

(57) ABSTRACT

A frame for hydraulic apparatus includes at least three supporting pillars, a supporting assembly mounted on the supporting pillars and including a fixed die plate fixed to the supporting pillars, an adjustable die plate slidably fixed to the at least three supporting pillars and a core plate slidably fixed to the at least three supporting pillars and located between the fixed die plate and the adjustable die plate and a link mechanism mounted on the supporting assembly and coupling the core plate to the adjustable die plate. The fixed die plate, the core plate and the adjustable die plate each have a periphery sidewall, and include a first protrusion protruded from the periphery sidewall and extended along a circumferential direction thereof, and define an indentation adjacent to the first protrusion and further define a plurality of openings on the first protrusion interconnected with the indentation.

16 Claims, 3 Drawing Sheets

100

(56) References Cited

U.S. PATENT DOCUMENTS

| | | | | | |
|---|---|---|---|---|---|
| 4,443,171 | A * | 4/1984 | Dixon | B30B 11/02 | 425/352 |
| 4,579,031 | A * | 4/1986 | Lash | B26D 5/12 | 83/626 |
| 4,599,924 | A * | 7/1986 | Klostermann | B21D 28/32 | 29/463 |
| 4,685,367 | A * | 8/1987 | Lash | B26D 5/12 | 100/272 |
| 4,828,477 | A * | 5/1989 | Uehara | B29C 45/1771 | 264/334 |
| 5,035,599 | A * | 7/1991 | Harashima | B29C 45/03 | 264/40.5 |
| 5,269,673 | A * | 12/1993 | Kempf | B29C 45/17 | 425/151 |
| 5,791,241 | A * | 8/1998 | Levy | B30B 1/08 | 100/271 |
| 6,314,852 | B1 * | 11/2001 | Long | B26D 7/26 | 100/219 |
| 2009/0229336 | A1 * | 9/2009 | Kuo | B21D 28/34 | 72/353.2 |
| 2013/0011513 | A1 * | 1/2013 | Fiore | B29C 45/03 | 425/542 |
| 2013/0240089 | A1 * | 9/2013 | Li | B21D 45/003 | 144/196 |

* cited by examiner

FRAME FOR HYDRAULIC APPARATUS

FIELD

The subject matter herein relates to a frame for a hydraulic apparatus.

BACKGROUND

Hydraulic apparatus can be used for machining. When in machining, lubrication, chilling, warming and insulation can be also needed, which needs to arrange a number of cables on the hydraulic apparatus.

BRIEF DESCRIPTION OF THE DRAWINGS

Many aspects of the present disclosure are better understood with reference to the follow drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
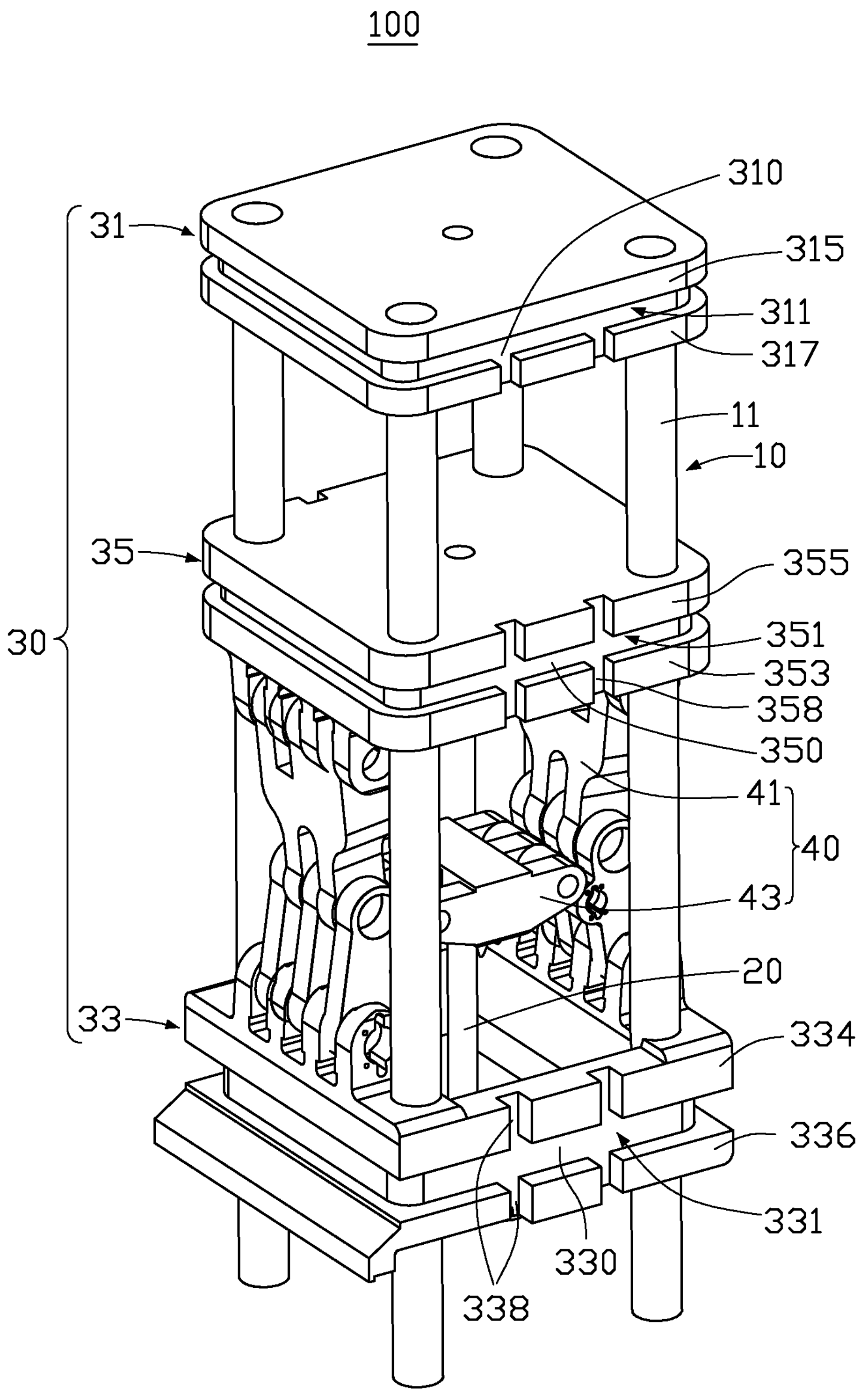
FIG. 1 is an isometric view of a first embodiment of a frame for a hydraulic apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description can be not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 shows a first embodiment of a frame for a hydraulic apparatus 100. The frame for the hydraulic apparatus 100 can include a first supporting assembly 10, a second supporting assembly 30 mounted on the first supporting assembly 10 and a link mechanism 40 mounted on the second supporting assembly 30.

The first supporting assembly 10 can include at least three supporting pillars 11. The at least three supporting pillars 11 can be parallel with each other. In this embodiment, the at least three supporting pillars 11 can include four supporting pillars 11.

The second supporting assembly 30 can include a fixed die plate 31, an adjustable die plate 33 and a core plate 35. The fixed die plate 31, the adjustable die plate 33 and the core plate 35 can be separate and parallel with each other.

The fixed die plate 31 can be equipped through the first supporting assembly 10 and fixed to one end of the first supporting assembly 10. The adjustable die plate 33 can be equipped through the first supporting assembly 10 and sliably fixed to other end of the first supporting assembly 10. The core plate 35 can be equipped through the first supporting assembly 10 and sliably located between the fixed die plate 31 and the adjustable die plate 33. The link mechanism 40 can couple the adjustable die plate 33 to the core plate 35 and drive the adjustable die plate 33 and the core plate 35 to slide synchronously.

The fixed die plate 31 can be, but not limited to, rectangular shaped. The fixed die plate 31 can have a first periphery sidewall 310. The fixed die plate 31 can include a first protrusion 313 and a second protrusion 315 both protruded from the first periphery sidewall 310 and extended along a circumferential direction of the fixed die plate 31. The first protrusion 313 and the second protrusion 315 can be separate and parallel with each other. The first protrusion 313 and the second protrusion 315 can cooperatively define a first indentation 311. The first indentation 311 can be ring-shaped and used to receive the cables (not shown) therein. The fixed die plate 31 can define a number of first through openings 317 on the first protrusion 313. The number of first through openings 317 can be interconnected with the first indentation 311. The number of first through openings 317 can be used to enable the cables to pass therethrough. In this embodiment, the first openings 317 can be defined on two opposite sides of the first protrusion 313.

The adjustable die plate 33 can be, but not limited to, rectangular shaped. The adjustable die plate 33 can have a second periphery sidewall 330. The adjustable die plate 33 can include a third protrusion 334 and a fourth protrusion 336 both protruded from the second periphery sidewall 330 and extended along a circumferential direction of the adjustable die plate 33. The third protrusion 334 can be located close to the fixed die plate 31. The fourth protrusion 336 can be located close to the core plate 35. The third protrusion 334 and the fourth protrusion 336 can be separate and parallel with each other. The third protrusion 334 and the fourth protrusion 336 can cooperatively define a second indentation 331. The second indentation 331 can be ring-shaped and used to receive the cables therein. The adjustable die plate 33 can define a number of second through openings 338 on the third protrusion 334 and fourth protrusion 336 respectively. The number of second through openings 338 can be interconnected with the second indentation 331. The number of second through openings 338 can be used to enable the cables to pass therethrough. In this embodiment, the second through openings 338 can be defined on two opposite sides of the third protrusion 334 and the fourth protrusion 336.

The core plate 35 can be, but not limited to, rectangular shaped. The core plate 35 can have a third periphery sidewall 350. The third core plate 35 can include a fifth protrusion 353 and a sixth protrusion 355 both protruded from the third periphery sidewall 350 and extended along a circumferential direction of the core plate 35. The fifth protrusion 353 can be located close to adjustable die plate 33. The sixth protrusion 355 can be located close to the fixed die plate 31.

The fifth protrusion 353 and the sixth protrusion 355 can cooperatively define a third indentation 351. The third indentation 351 can be ring-shaped and used to receive the cables therein. The core plate 35 can define a number of third through openings 358 on the fifth protrusion 353 and the sixth protrusion 355 respectively. The number of third through openings 358 can be interconnected with the third indentation 351. The third through openings 358 can be used to enable the cables to pass therethrough. The third through openings 358 can be defined on two opposite sides of the fifth protrusion 353 and the sixth protrusion 355 respectively.

The link mechanism 40 can include two driving arms 41 and a connecting arm 43 coupling the two driving arms 41. The two driving arms 41 can be substantially parallel with each other. Each driving arm 41 can be coupled between the adjustable die plate 33 and the core plate 35. The connecting arm 43 can be further coupled to an driving shaft 20 of an oil cylinder (not shown), thus the adjustable die plate 33 and the core plate 35 can be driven to move synchronously by the oil cylinder.

In this embodiment, each first through opening 317 can be aligned to one of the number of second through openings 338 and one of the number of third through openings 358.

In at least one embodiment, the number of first through openings 317 can be both defined on the first protrusion 313 and the second protrusion 315.

In at least one embodiment, the number of second through openings 338 can be only defined on the third protrusion 334.

When in assembly, the fixed die plate 31 can be equipped through the first supporting assembly 10 and fixed to the first supporting assembly 10; the adjustable die plate 33 and the core plate can be equipped through the first supporting assembly 10 and sliably fixed to the first supporting assembly 10 in that order; the link mechanism 40 can be coupled between the adjustable die plate 33 and the core plate 35, and further coupled to the driving shaft 20. The cables can be pushed to pass through the number of the first through openings 317, the number of second through openings 338 and the number of third through openings 358, and further received in first indentation 311, or the second indentation 331, or the third indentation 351.

Figure 2:
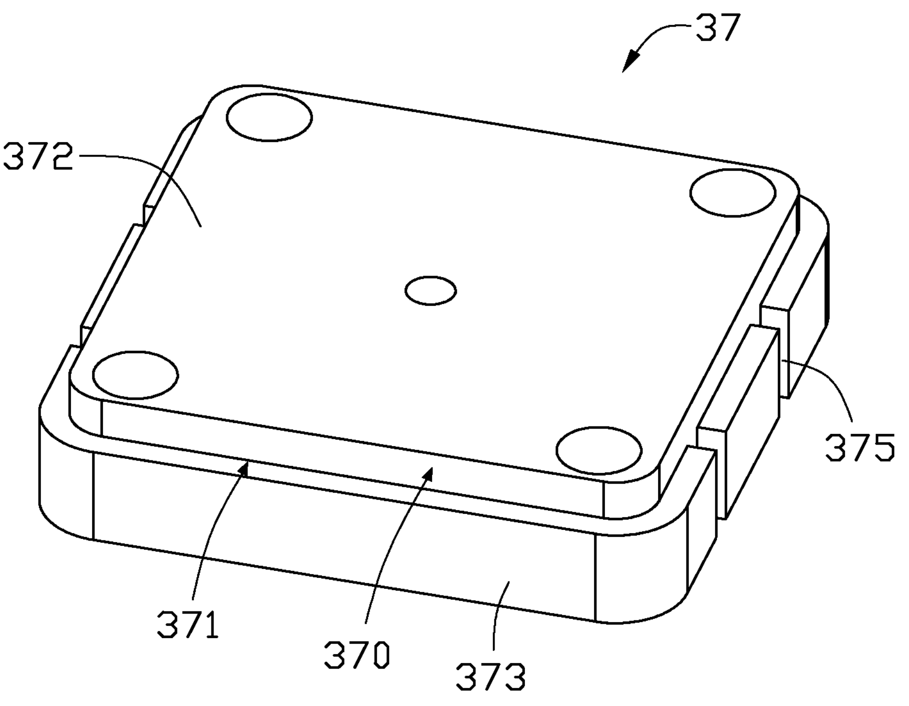
FIG. 2 is an isometric view of a second embodiment of a fixed die plate.

FIG. 2 shows a second embodiment of a frame for hydraulic apparatus. The frame for hydraulic apparatus can include a fixed die plate 37, an adjustable die plate (not shown) and a core plate (not shown) which are same with the fixed die plate 37. The fixed die plate 37 is similar to the fixed die plate 31. The fixed die plate 37 can have a fourth periphery sidewall 370 and a first surface 372 adjacent to the fourth periphery sidewall 370. The fixed die plate 37 can include a seventh protrusion 373 protruded from one side of the fourth periphery sidewall 370 away from the first surface 372 and extended along a circumferential direction of the fixed die plate 31. The fourth periphery sidewall 370 and the seventh protrusion 373 can cooperatively define a fourth indentation 371. The fourth indentation 371 can be ring-shaped and used to receive cables therein. The fixed die plate 33 can define a number of fourth through openings 338 on the seventh protrusion 373. The fourth through openings 338 can be used to enable the cables to pass therethrough.

Figure 3:
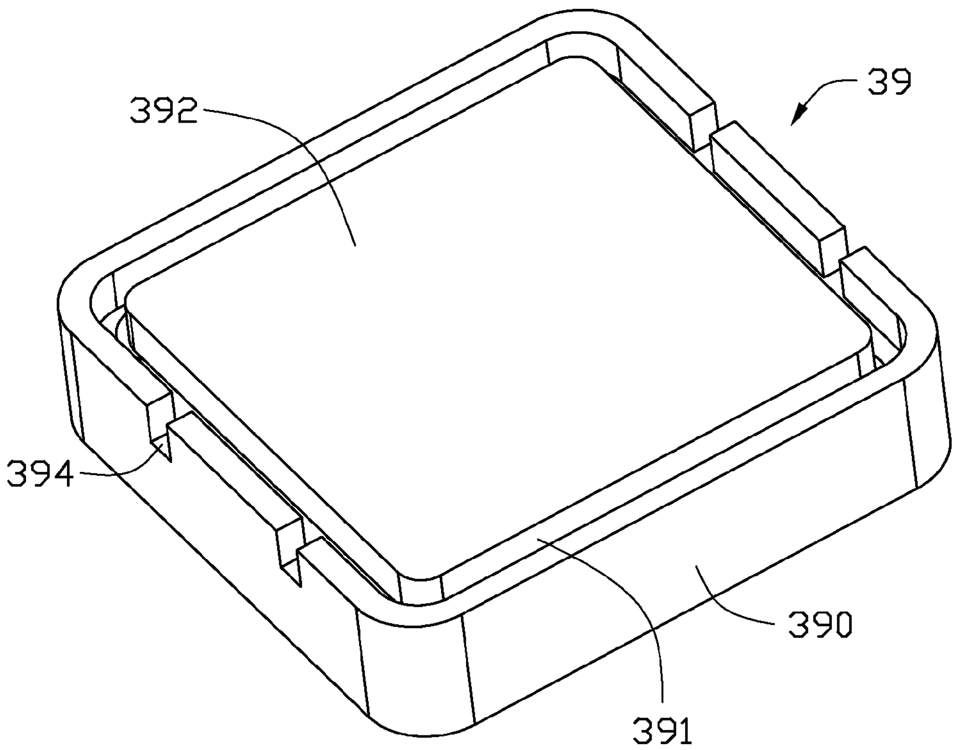
FIG. 3 is an isometric view of a third embodiment of a fixed die plate.

FIG. 3 shows a third embodiment of a frame for hydraulic apparatus. The frame for hydraulic apparatus can include a fixed die plate 39, an adjustable die plate 33 and a core plate (not shown) which is same with the fixed die plate 39. The fixed die plate 39 is similar to the fixed die plate 31. The fixed die plate 39 can have a fifth periphery sidewall 390 and a second surface 392 adjacent to the fifth periphery sidewall 390. The fixed die plate 39 can define a fifth ring-shaped indentation 391 on the second surface 392 and extended along a circumferential direction of the fixed die plate 39. The fixed die plate 39 can further define a number of fifth through openings 394 interconnected with the fifth indentation 391 and cut through the fifth periphery sidewall 390.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A frame for a hydraulic apparatus, the frame comprising at least two supporting pillars parallel with each other;

a supporting assembly mounted on the at least two supporting pillars and comprising a fixed die plate fixed to the at least two supporting pillars;

an adjustable die plate slidably fixed to the supporting assembly; and a core plate slidably fixed to the at least two supporting pillars and located between the fixed die plate and the adjustable die plate; and a link mechanism mounted on the supporting assembly and coupling the core plate to the adjustable die plate;

wherein the fixed die plate, the core plate and the adjustable die plate each have a periphery sidewall, comprise a first protrusion protruding therefrom along a circumferential direction thereof, define an indentation adjacent to the first protrusion for cables receiving therein, and further define a plurality of through openings on the first protrusion interconnected with the indentation, the plurality of through openings configured to enable the cables to pass therethrough.

2. The frame for the hydraulic apparatus of claim 1, wherein the fixed die plate further comprises a second protrusion protruded from the periphery sidewall and extended along the circumferential direction of the fixed die plate, and the first protrusion and the second protrusion are separate and parallel with each other, and the indentation is defined between the first protrusion and the second protrusion.

3. The frame for the hydraulic apparatus of claim 1, wherein the core plate further comprises a second protrusion protruded from the periphery sidewall and extended along the circumferential direction of the core plate, and the first protrusion is located close to adjustable die plate, and the second protrusion is located close to the fixed die plate, and the first protrusion and the second protrusion are separate and parallel with each other, and the indentation is defined between the first protrusion and the second protrusion.

4. The frame for the hydraulic apparatus of claim 3, wherein the plurality of through openings are further defined on the second protrusion.

5. The frame for the hydraulic apparatus of claim 1, wherein the adjustable die plate further comprises a second protrusion protruded from the periphery sidewall and extended along the circumferential direction of the adjustable die plate, the first protrusion is located close to the fixed die plate, and the second protrusion is located close to the core plate, and the first protrusion and the second protrusion are separate and parallel with each other, and the indentation is defined between the first protrusion and the second protrusion.

6. The frame for the hydraulic apparatus of claim 5, wherein the plurality of through openings are further defined on the second protrusion.

7. The frame for the hydraulic apparatus of claim 1, wherein the plurality of through openings are aligned with each other.

8. A frame for a hydraulic apparatus comprising at least two supporting pillars parallel with each other;

a supporting assembly mounted on the at least two supporting pillars and comprising a fixed die plate fixed to the at least two supporting pillars;

an adjustable die plate slidably fixed to the first supporting assembly; and a core plate slidably fixed to the at least two supporting pillars and located between the fixed die plate and the adjustable die plate; and a link mechanism mounted on the supporting assembly and coupling the core plate to the adjustable die plate;

wherein the fixed die plate defines a first indentation extended along a circumferential direction of the fixed die plate for cables receiving therein, and further define a plurality of first through openings interconnected with the first indentation and configured to enable the cables to pass therethrough; the core plate and the adjustable die plate each have a periphery sidewall, and comprise a first protrusion protruded from the periphery sidewall and extended along a circumferential direction thereof, and define a second indentation adjacent to the first protrusion for cables receiving therein, and further define a plurality of second through openings on the first protrusion interconnected with the second indentation and configured to enable the cables to pass therethrough.

9. The frame for the hydraulic apparatus of claim 8, wherein the core plate further comprises a second protrusion protruded from the periphery sidewall and extended along the circumferential direction of the core plate, and the first protrusion is located close to adjustable die plate, and the second protrusion is located close to the fixed die plate, and the first protrusion and the second protrusion are separate and parallel with each other, and the second indentation is defined between the first protrusion and the second protrusion.

10. The frame for the hydraulic apparatus of claim 9, wherein the plurality of through openings are further defined on the second protrusion.

11. The frame for the hydraulic apparatus of claim 8, wherein the adjustable die plate further comprises a second protrusion protruded from the periphery sidewall and extended along the circumferential direction of the adjustable die plate, the first protrusion is located close to the fixed die plate, and the second protrusion is located close to the core plate, and the first protrusion and the second protrusion are separate and parallel with each other, and the indentation is defined between the first protrusion and the second protrusion.

12. The frame for the hydraulic apparatus of claim 11, wherein the plurality of first through openings are further defined on the second protrusion.

13. The frame for the hydraulic apparatus of claim 8, wherein the plurality of first through openings are aligned with each other.

14. A frame for a hydraulic apparatus comprising at least two supporting pillars parallel with each other;

a first supporting assembly;

a supporting assembly mounted on the first supporting assembly and comprising a fixed die plate fixed to the at least two supporting pillars, an adjustable die plate slidably fixed to the first supporting assembly, and a core plate slidably fixed to the at least two supporting pillars and located between the fixed die plate and the adjustable die plate; and a link mechanism mounted on the supporting assembly and coupling the core plate to the adjustable die plate;

wherein each of the fixed die plate and the adjustable die plate defines a first indentation for cables receiving therein, and further define a plurality of first through openings interconnected with the first indentation and configured to enable the cables to pass therethrough; the core plate has a periphery sidewall, and comprises a first protrusion protruded from the periphery sidewall and extended along the circumferential direction of the core plate, and define a second indentation adjacent to the first protrusion for cables receiving therein, and further define a plurality of second through openings on the first protrusion interconnected with the second indentation and configured to enable the cables to pass therethrough.

15. The frame for the hydraulic apparatus of claim 14, wherein the core plate further comprises a second protrusion protruded from the periphery sidewall and extended along the circumferential direction of the core plate, and the first protrusion is located close to adjustable die plate, and the second protrusion is located close to the fixed die plate, and the first protrusion and the second protrusion are separate and parallel with each other, and the indentation is defined between the first protrusion and the second protrusion.

16. The frame for the hydraulic apparatus of claim 15 wherein the first plurality of through openings are further defined on the second protrusion.

* * * * *